(12) United States Patent
Mozafari

(10) Patent No.: US 10,177,598 B1
(45) Date of Patent: Jan. 8, 2019

(54) ENERGY STORAGE SYSTEM

(71) Applicant: Mehdi Mozafari, Encino, CA (US)

(72) Inventor: Mehdi Mozafari, Encino, CA (US)

( * ) Notice: Subject to any disclaimer, the term of this patent is extended or adjusted under 35 U.S.C. 154(b) by 0 days.

(21) Appl. No.: 14/835,878

(22) Filed: Aug. 26, 2015

(51) Int. Cl.
*H02J 50/00* (2016.01)
*H02J 17/00* (2006.01)

(52) U.S. Cl.
CPC ................... *H02J 17/00* (2013.01)

(58) Field of Classification Search
CPC ................... G08G 1/04; G08G 1/052
See application file for complete search history.

(56) References Cited

U.S. PATENT DOCUMENTS

| | | | |
|---|---|---|---|
| 5,798,983 A * | 8/1998 | Kuhn | H04B 11/00 367/127 |
| 7,460,949 B2 * | 12/2008 | Wilbrod | G08G 1/04 340/928 |
| 8,115,652 B2 * | 2/2012 | Lee | G08G 1/0104 340/901 |
| 8,712,105 B2 * | 4/2014 | Rowsell | G06K 9/00785 382/104 |
| 9,286,798 B2 * | 3/2016 | Kim | G08G 1/052 |
| 9,322,905 B2 * | 4/2016 | Kishigami | G01S 13/91 |
| 9,378,640 B2 * | 6/2016 | Mimeault | G01S 17/023 |
| 2011/0074947 A1 * | 3/2011 | Kuan | G08G 1/052 348/135 |

FOREIGN PATENT DOCUMENTS

JP          05052950 A  *  3/1993

* cited by examiner

*Primary Examiner* — Jeffery S Zweizig

(57) ABSTRACT

An improved energy storage system which captures some of the energy expended by vehicles traveling along a road by bouncing a signal off an approaching vehicle and capturing the returning signal for storage and later reuse.

1 Claim, 2 Drawing Sheets

ENERGY STORAGE SYSTEM

FIELD OF INVENTION

Figure 1:
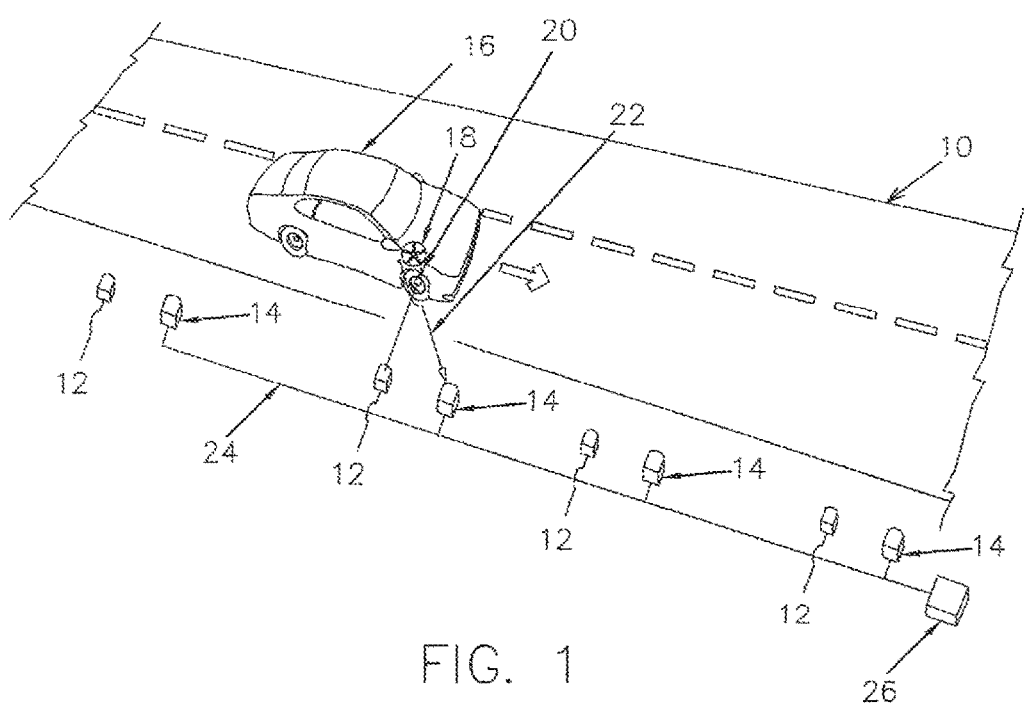

This invention relates to energy storage and particularly to an improved energy storage system.

BACKGROUND

It is well known that automobiles use considerable energy in traveling along roads, often at high speeds. However, aside from transporting people or products from one place to another, little or no use has been made of this energy. It is known to bounce radio or sound waves off of such automobiles and to measure the frequency of the reflected signal to measure the speed of the vehicle This is known as the Doppler effect. However, no effort has been made, heretofore, to capture the amplitude of the returning signal to capture some of this added energy for storage and reuse. This phenomenon can best be understood by an analogy from baseball. When a player bunts a ball, they hold the bat stationary in the path of the baseball. The ball strikes the bat with only the energy of the pitch and, hence, bounces back only a short distance to land between home plate and the pitcher's mound. However, if the player gives the bat a full swing, the ball strikes the bat with the energy of the pitch PLUS the energy of the swing and soars several hundred feet into the outfield for a base hit or home run. Similarly, when the transmitted signal impacts a moving vehicle, the returning signal will have the energy of the transmitted signal PLUS energy absorbed from the moving vehicle. This has not been appreciated heretofore. Thus, none of the prior art systems have been entirely satisfactory.

BRIEF SUMMARY AND OBJECTS OF INVENTION

These disadvantages of the prior art are overcome with the present invention and improved systems are provided for bouncing a signal off of an approaching vehicle and capturing the returning signal for storage and reuse.

These advantages of the present invention are preferably attained by providing an improved measuring system which bounces a signal off of an approaching vehicle and captures the returning signal for storage and subsequent reuse.

Accordingly, it is an object of the present invention to provide an improved energy storage system.

Another object of the present invention is to provide an improved system for capturing and storing some of the energy expended by vehicles traveling along a road.

A further object of the present invention is to provide an improved energy storage system which captures some of the energy expended by vehicles traveling along a road for storage and later reuse.

A specific object of the present invention is to provide an improved energy storage system which captures some of the energy expended by vehicles traveling along a road by bouncing a signal off an approaching vehicle and capturing the returning signal for storage and later reuse.

These and other objects and features of the present invention will be apparent from the following detailed description, taken with reference to the figures of the accompanying drawing.

IN THE DRAWING

Figure 2:
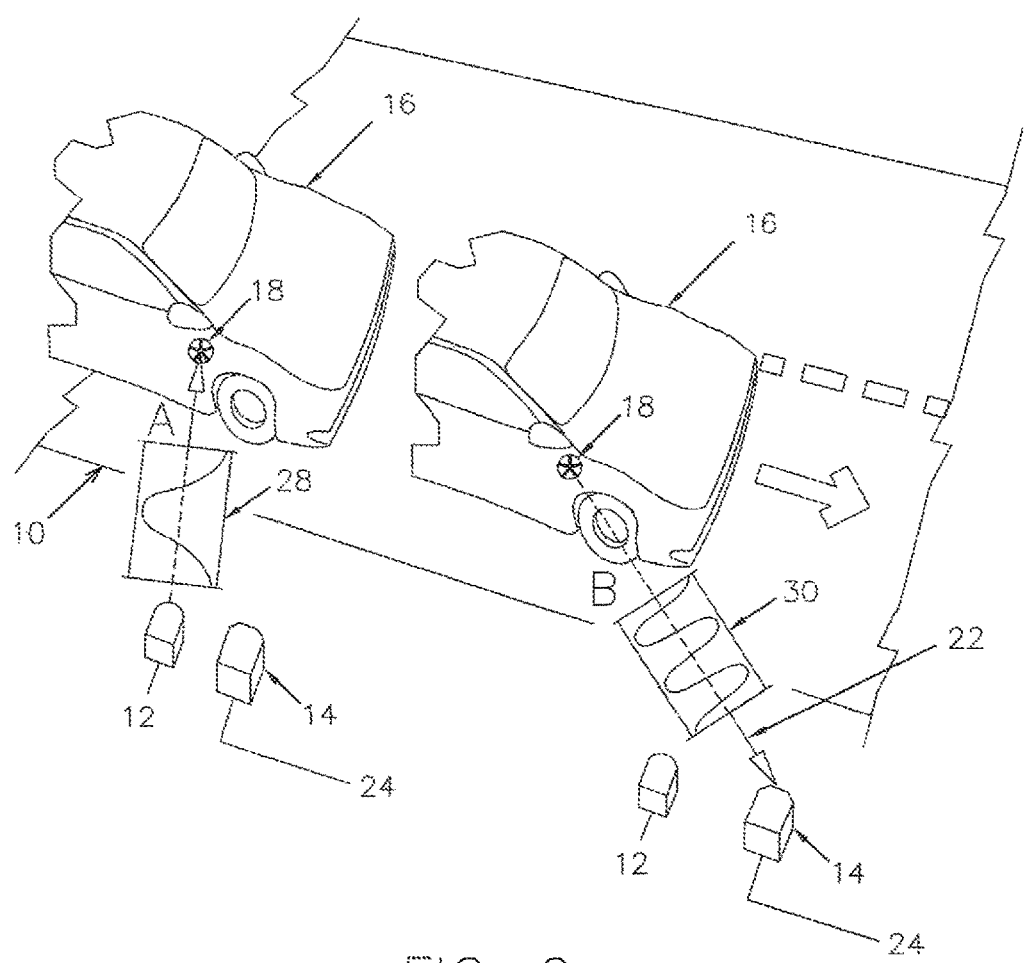

FIG. 1 is a diagrammatic representation of an energy storage system embodying the present invention; and FIG. 2 is a diagrammatic representation showing a signal being bounced off an approaching vehicle in the system of FIG. 1.

DETAILED DESCRIPTION OF THE INVENTION

In that form of the present invention chosen for purposes of illustration, FIG. 1 shows a road 10 having a plurality of arrays of transmitters 12 and receivers 14 located at spaced locations along the road 10. When a vehicle 16 travels along the road 10, the transmitters 12 send out signals 18 which strike the vehicle 10, as seen at 20, and are reflected back, as seen at 22, to the adjacent receiver 14. The signals emitted by the transmitters 12 may be optical, acoustic or electrical. The receivers 14 capture the reflected signals 22, covert them into corresponding electrical signals, process the signals to obtain any information carried by the signals, such as the speed of the vehicle, then pass the electrical signal through conductors 24 to suitable means 26 for storing or reusing the energy of the signals.

As seen in FIG. 2, the transmitter 12 emits a signal at a given energy level, as seen at 28 in FIG. 2, which impacts the vehicle 16 at point 18. However, since the vehicle 16 is moving at the moment of impact, the impact point 18 is also moved, from Point A to Point B, and the energy of the moving vehicle is added to the reflected signal 22, as seen at 30 The reflected signal 22 is captured by the receiver 14, processed to retrieve any information carried by the signal and is passed through conductor 24 to means 26 for storage or reuse.

Obviously, numerous variations and modifications can be made without departing from the spirit o0f the present invention.

Therefore, it should be clearly understood that the forms of the present invention described above and shown in the figures of the accompanying drawing rare illustrative only and are not intended to limit the scope of the present invention.

What is claimed is:

1. An energy storage system comprising:
a road;
a vehicle;
a plurality of transmitter and receiver pairs;
a conductor;
an energy storage unit;
the vehicle moving along the road;
the plurality of transmitter and receiver pairs being adjacently located to the road;
each transmitter and receiver pair among the plurality of transmitter and receiver pairs being placed along the road in spaced relation; and
each transmitter and receiver pair among the plurality of transmitter and receiver pairs comprising a transmitter and a receiver, the receiver being electrically connected with the energy storage unit via the conductor, a signal being emitted by the transmitter, then impacting the vehicle, then being reflected by the vehicle, then being captured by the receiver and then being passed to the energy storage unit via the conductor, the signal being an optical signal, an acoustical signal or an electrical signal.

* * * * *